Oct. 24, 1972 SIEGFRIED MALANG 3,700,553

NUCLEAR REACTOR FUEL ELEMENT

Filed Dec. 15, 1969

INVENTOR
Siegfried Malang

*Spencer & Kaye*

BY ATTORNEYS.

United States Patent Office 3,700,553
Patented Oct. 24, 1972

3,700,553
NUCLEAR REACTOR FUEL ELEMENT
Siegfried Malang, Karlsruhe, Germany, assignor to Gesellschaft fur Kernforschung mbH, Karlsruhe, Germany
Filed Dec. 15, 1969, Ser. No. 885,108
Claims priority, application Germany, Dec. 23, 1968, P 18 16 544.1
Int. Cl. G21c 3/18
U.S. Cl. 176—72     11 Claims

ABSTRACT OF THE DISCLOSURE

A nuclear reactor fuel element has a can surrounding the fuel and defining at least one void kept under pressure and cooled by a flowing coolant. The void forms a fission gas plenum subdivided into two regions separated from each other so as to be gastight by means of a movable separating element. One region is connected with the fissile and fertile material to accommodate the fission gases, while the other region contains steam which condenses as a function of the increasing quantity of fission gases in the one region.

---

The invention relates to a nuclear reactor fuel element with a can surrounding the fuel and at least one void, kept under an internal gas pressure and cooled by a flowing coolant.

In the course of nuclear reaction fission gases are produced which build up an increasing internal gas pressure in the fuel element with increasing burnup of the fuel. The difference between the internal gas pressure and the external coolant pressure must be accomodated chiefly by the fuel element can and, hence, must not exceed specific values with respect to the maximum permissible stress on the canning material. However, this means that the safe life of a fuel element depends also on the pressure buildup and the maximum permissible pressure of the fission gases, among other factors.

To delay the pressure buildup, e.g., rod-type fuel elements are known to be provided with a so-called fission gas plenum. For this purpose, the can is extended, usually in the direction of the coolant inlet side, beyond the area containing the fissile or fertile material so that an additional void is created which is filled with a gas, e.g., helium and in which the fission gases collect during irradiation in the reactor. Normally, the quantity of gas added artificially is dimensioned so that the internal pressure at the beginning of the service life is lower than the external coolant pressure. This exerts first a pressure and, later on, as soon as sufficient fission gases have accumulated, a tensile stress is exerted on the can.

The size of the void acting as the fission gas plenum is limited, however, for design and thermodynamical reasons so that it is not possible to keep the pressure buildup at a minimum.

On the basis of this state of the art the present invention serves the purpose of creating a fuel element by simple means the fission gas plenum of which is capable of accommodating considerably larger quantities of fission gas without causing the internal pressure to rise to unduly high levels.

In the invention, this problem is solved in that the void serving as the fission gas plenum is subdivided into two regions which are separated from each other so as to be gastight by means of a movable separation element, one region accommodating fission gases and connected with the fissile and fertile material, respectively, the other region containing steam which condenses as a function of the increasing quantity of fission gases.

If, at the beginning of burnup, the steam is in the dry saturated condition the internal pressure in the fuel elementt will remain constant despite the increasing quantity of fission gas, until all of the steam has condensed. In this way, it is possible to extend the service life by a corresponding margin or to design the can in such a way with respect to wall thickness and material that it may have a lower mechanical strength but more advantageous neutron physics properties, which is useful especially in fast breeder reactors with respect to the maximum breeding ratio achievable. For, the initial internal pressure at the beginning of the service life, which so far has been produced by means of a pressurizing gas, is generated in the invention either wholly or partially by means of the steam which will be recondensed later on. Of course, this property can be utilized also to reduce the volume of the fission gas plenum.

For this purpose it is advantageous to fill the volume partially with a liquid, e.g., water, before inserting the fuel element into the reactor, which liquid evaporates at the heat transferred to the can by the reactor coolant and the critical steam temperature of which is above the temperature of the coolant.

It is possible to dose the liquid in relation to the void volume and the gas pressure inside it generated by a filling gas, e.g., helium, so that the internal pressure established in the can after evaporation roughly equals the pressure of the external coolant. In a steam cooled reactor, if water is used as the liquid, the initial internal pressure may also be lower than the coolant pressure. In the beginning, this even relieves the stress on the can because of the amount of fission gas flowing in at the beginning of the service life, when all the liquid has evaporated until, later on, a constant overpressure is established in the can relative to the coolant as a result of the condensation of the steam with further increasing quantities of fission gas. The invention can be applied also to gas cooled reactors after the proper choice of the liquid to be evaporated, e.g., radiation resistant organic solutions whose critical temperature is above the coolant temperature.

The invention counteracts the undesirable collapsing of the fuel element just as efficiently as it counteracts deformation (expansion and bursting) as a result of excessively high internal pressures of the can. To prevent the steam and the liquid, respectively, from contacting the fissile or fertile materials it is useful to subdivide the void by means of a movable separating element into two regions one of which is connected with the fuel to accommodate the fission gases, whilst the other region contains the liquid and steam, respectively. An elastic membrane may be used as the separating element, for instance. However, instead it is possible also to separate the two regions as in communicating tubes or in the way of a suction cup seal by means of medium which is liquid at operating temperature, especially a liquid metal such as lead.

Below, two embodiments of the invention are explained in greater detail on the basis of the drawings.

Figure 1:
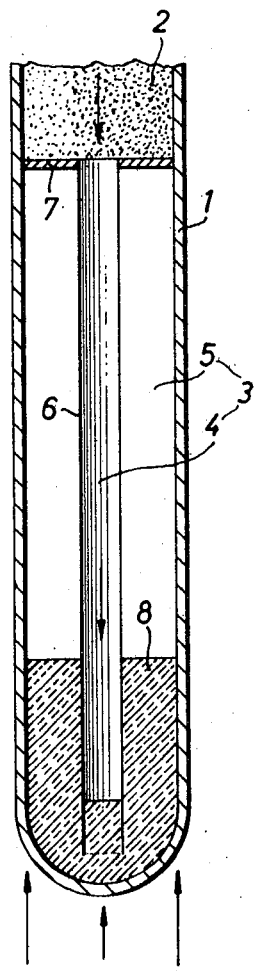
FIG. 1 is a schematic representation of the bottom part of a rod-type fuel element the fission gas plenum of which is subdivided into one region for the accommodation of the fission gases and one steam volume.

The can 1 of the rod-type fuel element is extended towards the bottom beyond the section 2 containing the fissile and fertile material, respectively, thus forming an additional pot-shaped chamber void 3 which serves as a fission gas plenum. The coolant, e.g., saturated steam or slightly superheated steam, flows towards the fuel element from the bottom in the direction of the arrow so that the part of the can 1 surrounding the void 3 is heated to the temperature of the entering coolant.

The void is subdivided into two regions, one fission gas collection space 4 and one steam space 5. For accommodation of the fission gases a tube 6 is provided the upper end of which is connected to the fuel zone 2 and the lower end of which is open and converges into the area of the bottom of the void. The steam space 5 in the upper part of the void 3 is formed by the can 1, a separating disk 7 adjacent to the fuel 2, by the tube 6 and a sealing plug 8. The sealing plug 8 may be made, e.g., of lead which liquefies upon heating and thus, like the sealing liquid in communicating tubes, assumes a different position depending upon the quantity of gas and steam, respectively, in the two spaces 4 and 5.

Before the use, space 5 is filled with a specific liquid and space 4, connected with the fuel zone 2, is filled with an inert gas, normally helium. The quantity of liquid can be dosed so that the steam pressure established at operating temperature, which is about equal to the coolant temperature, corresponds roughly to the coolant pressure. However, it is possible also to keep the internal pressure slightly lower at the beginning of the service life, depending upon the permissible stress on cladding tube, so that the can is first relieved from stress with increasing fission gas pressure. With the further increase in the quantity of fission gases in space 4 the internal pressure in spaces 4 and 5 increases till the steam in space 5 has reached the dry saturated condition. From this condition on the internal pressure in spaces 4 and 5 remains constant also upon further increase in the quantity of fission gas because the steam starts condensation and the volume this releases can be made use of by the fission gases in void 3. Only after all the steam has condensed the internal pressure would rise again.

Figure 2:
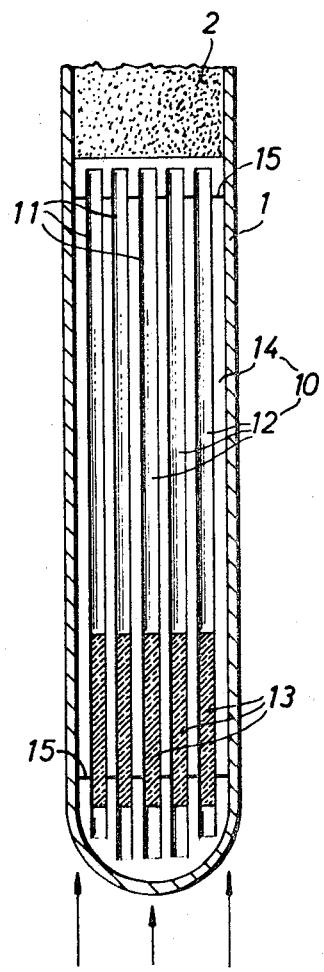
FIG. 2 is a variant of that design with several tubes, which are closed on one side, being provided as the steam volume.

In FIG. 2 several thin tubes 11 are arranged in the fission gas plenum 10 with their upper ends closed and their open bottom ends converging into the area of the bottom of the plenum. The tubes 11 contain the liquid to be evaporated in the region of their closed ends 12. Leakage of the liquid is prevented by a plug 13, similar to FIG. 1, which liquefies upon heating. This plug may also fill up the bottom part of the plenum 10 up to and above the orifice of the tubes 11 so that no liquid and steam, respectively, can enter the fission gas plenum 14 into the fission gases flow directly from the fuel zone 2. The use of these tubes 11, which may be fixed relative to the can 1 by means of suitable supports 15, utilizes especially the capillary action relative to liquids. For the rest, the action is similar to the example explained in FIG. 1. The melting point of the plugs 8 and 13, respectively, must of course be lower than the operating temperature of the coolant.

I claim:

1. A nuclear reactor fuel element for use in a nuclear reactor which provides a coolant for the element, the element comprising, in combination:
    (a) a can having in its interior a fuel zone as well as a chamber, the latter being divided into two separate regions one of which is in communication with said fuel zone;
    (b) movable separating means arranged in said can for establishing a gas tight seal between said two regions;
    (c) fuel arranged in said fuel zone; and
    (d) a liquid arranged in the other of said regions, said liquid being evaporatable to steam by heat transferred by the coolant of the reactor in which the fuel element is utilized, the steam being a means which is condensable as a function of the increasing quantity of fission gases in said one region.

2. A nuclear reactor fuel element as defined in claim 1, wherein said liquid has a kinetic steam temperature which is above the temperature of the coolant.

3. A nuclear reactor fuel element as defined in claim 2, wherein the quantity of liquid in said other region is a function of the volume of said chamber and of the gas pressure inside said chamber by a filling gas, so that the internal pressure inside said can established after evaporization is slightly lower than the pressure of the coolant.

4. A nuclear reactor fuel element as defined in claim 2, wherein the quantity of liquid in said other region is a function of the volume of said chamber and of the gas pressure inside said chamber by a filling gas, so that the internal pressure inside said can established after evaporization is slightly lower than the pressure of the coolant.

5. A nuclear reactor fuel element as defined in claim 2, wherein the quantity of liquid in said other region is such that the steam produced reaches roughly the dry saturated condition.

6. A nuclear reactor fuel element as defined in claim 2, wherein said separating means comprise an elastic membrane.

7. A nuclear reactor fuel element as defined in claim 2, wherein said two regions are constituted by communicating tubes and wherein said separating means are constituted by a sealing liquid.

8. A nuclear reactor fuel element as defined in claim 7, wherein said sealing liquid is a liquid metal.

9. A nuclear reactor fuel element as defined in claim 2, wherein said can includes at least one upright tube arranged in said can with the interior of said tube defining said one region and the space within said can but outside of said tube defining said other region, the lower end of said tube opening into the bottom portion of said other region; said separating means being constituted by a sealing plug which closes said lower end of said tube and which is made of material that liquefies at operating temperature and, in liquid state, separates said two regions.

10. A nuclear reactor fuel element as defined in claim 2, wherein said can includes at least one upright tube arranged in said can with the interior of said tube defining said other region, and the space within said can but outside of said tube defining said one region, the upper end of said tube being closed and the lower end of said tube opening into the bottom portion of said one region; said separating means being constituted by a sealing plug which closes said lower end of said tube and which is made of material that liquefies at operating temperature and, in liquid state, separates said two regions.

11. A nuclear reactor fuel element as defined in claim 10, wherein said can includes a plurality of said upright tubes.

References Cited
UNITED STATES PATENTS 3,350,271 10/1967 Maidment et al. _____ 176—19
3,406,094 10/1968 Beisswenger et al. _____ 176—79

CARL D. QUARFORTH, Primary Examiner

G. G. SOLYST, Assistant Examiner

U.S. Cl. X.R.

176—68, 79